US010120914B2

(12) United States Patent
Vogt

(10) Patent No.: US 10,120,914 B2
(45) Date of Patent: Nov. 6, 2018

(54) MECHANISM FOR FACILITATING IMPROVED SEARCHING

(71) Applicant: salesforce.com, inc., San Francisco, CA (US)

(72) Inventor: James D. Vogt, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 433 days.

(21) Appl. No.: 14/207,111

(22) Filed: Mar. 12, 2014

(65) Prior Publication Data
US 2014/0279749 A1  Sep. 18, 2014

Related U.S. Application Data

(60) Provisional application No. 61/799,932, filed on Mar. 15, 2013.

(51) Int. Cl.
G06F 17/30 (2006.01)

(52) U.S. Cl.
CPC .. G06F 17/30554 (2013.01); G06F 17/30427 (2013.01)

(58) Field of Classification Search
CPC .............. G06F 17/30; G06F 17/30554; G06F 17/30427; G06F 17/30976; G06N 99/00; G06N 99/005
USPC .............................. 706/12; 707/72, 767, 722
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |

(Continued)

OTHER PUBLICATIONS

Weissman C. et al., "The Design of the Force.com Multitenant Internet Application Development Platform", SIGMOD'09, Jun. 29-Jul. 2, 2009, Providence, Rhode Island, USA.*

(Continued)

*Primary Examiner* — Dave Misir
(74) *Attorney, Agent, or Firm* — Jefffery, Watson, Mendonsa & Hamilton, LLC

(57) ABSTRACT

Improved integrated search techniques. A request for performance of a search for objects is received within a multi-tenant database environment having a plurality of tenants each having individual tenant information. A query is generated in response to the request. The query is specialized based on tenant information corresponding to a tenant from which the request originates. The tenant information is retrieved from the multi-tenant database environment. The query is performed on information stored in the multi-tenant database environment. Results of the query are presented to a user in a graphical user interface.

20 Claims, 17 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1* | 8/2002 | Warner ............... G06F 17/3061 |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0124276 A1* | 5/2007 | Weissman ......... G06F 17/30442 |
| 2010/0281014 A1* | 11/2010 | Weissman ......... G06F 17/30442 707/715 |
| 2011/0258179 A1* | 10/2011 | Weissman ......... G06F 17/30389 707/714 |
| 2011/0258199 A1* | 10/2011 | Oliver ................ G06F 17/3053 707/746 |
| 2011/0264681 A1* | 10/2011 | Kimberlin ......... G06F 17/30976 707/767 |
| 2011/0295838 A1* | 12/2011 | Collins ............. G06F 17/30463 707/715 |
| 2011/0295839 A1* | 12/2011 | Collins ............. G06F 17/30463 707/716 |
| 2012/0078825 A1* | 3/2012 | Kulkarni ........... G06F 17/30864 706/12 |
| 2012/0198334 A1 | 8/2012 | Surin et al. |
| 2013/0054582 A1* | 2/2013 | Macklem ......... G06F 17/30864 707/723 |
| 2013/0073546 A1* | 3/2013 | Yan .................. G06F 17/30321 707/732 |

OTHER PUBLICATIONS

Non-Final Office Action from U.S. Appl. No. 14/256,805 dated Jun. 17, 2016, 32 pgs.

Final Office Action for U.S. Appl. No. 14/256,805 dated Aug. 10, 2017, 34 pages.

Final Office Action for U.S. Appl. No. 14/256,805 dated Dec. 27, 2016, 31 pages.

* cited by examiner

United States patent application is related to, and
claims priority to U.S. provisional patent application Ser.
No. 61/799,932, filed Mar. 15, 2013, entitled "Mechanism
for Facilitating Improved Searching," the entire contents of
which are incorporated herein by reference.

COPYRIGHT NOTICE

A portion of the disclosure of this patent document
contains material, which is subject to copyright protection.
The copyright owner has no objection to the facsimile
reproduction by anyone of the patent document or the patent
disclosure, as it appears in the Patent and Trademark Office
patent file or records, but otherwise reserves all copyright
rights whatsoever.

TECHNICAL FIELD

One or more implementations relate generally to search
techniques and, more specifically, to a mechanism for facilitating improved and/or more intuitive search interfaces.

BACKGROUND

Typical search interfaces using computing devices
involve one or more fields where a user may type search
terms. Some search interfaces also include other options
including, for example, data ranges or result types (e.g.,
images, documents). While this type of search experience
has become relatively common, it is not necessarily the most
efficient and/or intuitive approach to providing a search
experience.

The subject matter discussed in the background section
should not be assumed to be prior art merely as a result of
its mention in the background section. Similarly, a problem
mentioned in the background section or associated with the
subject matter of the background section should not be
assumed to have been previously recognized in the prior art.
The subject matter in the background section merely represents different approaches.

BRIEF DESCRIPTION OF THE DRAWINGS

In the following drawings like reference numbers are used
to refer to like elements. Although the following figures
depict various examples, one or more implementations are
not limited to the examples depicted in the figures.

DETAILED DESCRIPTION

Methods and systems are provided for facilitating an
improved search experience. In one embodiment, an immersive search can be a full-page search flow interface that
enables users to search within various types of objects as
well as create natural language queries that are translated
into commands, for example, in a customer relationship
management (CRM) environment.

In one embodiment, the search experience can provide
one or more of an ability to append queries (e.g., enables
user to generate "list views," or specialized queries by
tapping). In one embodiment, the search experience can
provide specialized queries may be aggregated across organizations/groups/clients/etc. In one embodiment, machine
learning and/or heuristics analysis can be used to customize
queries based on one or more of: user behavior, user
research, product intelligence and/or other factors.

In one embodiment, a "starter pack" of common queries
can be provide to seed a adaptive and/or dynamic search
experience. In one embodiment, queries may be clustered
based on history, context and/or other considerations. In one
embodiment, the search functionality is provided within a
multi-tenant database environment; however, the multi-tenant database environment is not required to provide the
search functionality, but it could have an impact on how data
is managed, searched and/or presented to a user.

As used herein, the term multi-tenant database system
refers to those systems in which various elements of hardware and software of the database system may be shared by
one or more customers. For example, a given application
server may simultaneously process requests for a great
number of customers, and a given database table may store
rows for a potentially much greater number of customers. As
used herein, the term query plan refers to a set of steps used
to access information in a database system.

In one embodiment, a multi-tenant database system utilizes tenant identifiers (IDs) within a multi-tenant environment to allow individual tenants to access their data while
preserving the integrity of other tenant's data. In one
embodiment, the multitenant database stores data for multiple client entities each identified by a tenant ID having one
of one or more users associated with the tenant ID. Users of
each of multiple client entities can only access data identified by a tenant ID associated with their respective client
entity. In one embodiment, the multitenant database is a
hosted database provided by an entity separate from the
client entities, and provides on-demand and/or real-time
database service to the client entities.

Figure 1:
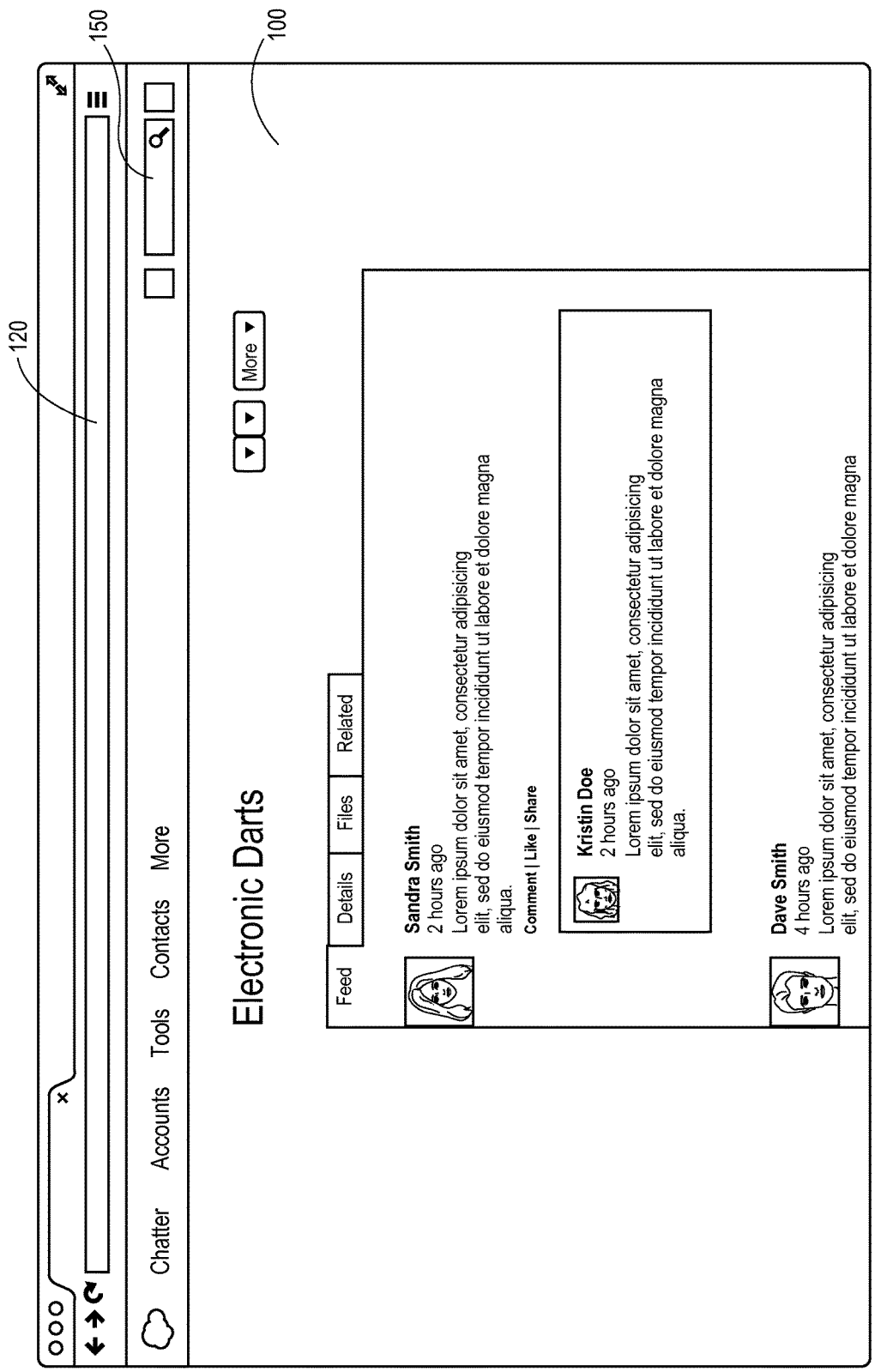
FIG. 1 is a graphical illustration of one embodiment of a
home screen that may be provided by a system utilizing the
search functionality as described herein.

FIG. 1 is a graphical illustration of one embodiment of a
home screen that may be provided by a system utilizing the
search functionality as described herein. Home screen 100
can include any number of items useful to a user. In one
embodiment, home screen 100 is accessible via a browser
application having window 120 to allow the user to navigate.
Home screen 100 can include search box 150. Any number
of mechanisms (e.g., dialog boxes, drop down menus, pop
up menus, keyboard shortcuts, input device selections, audio
input, for example, voice commands, eye tracking input) to
access search functionality can be supported.

Figure 2:
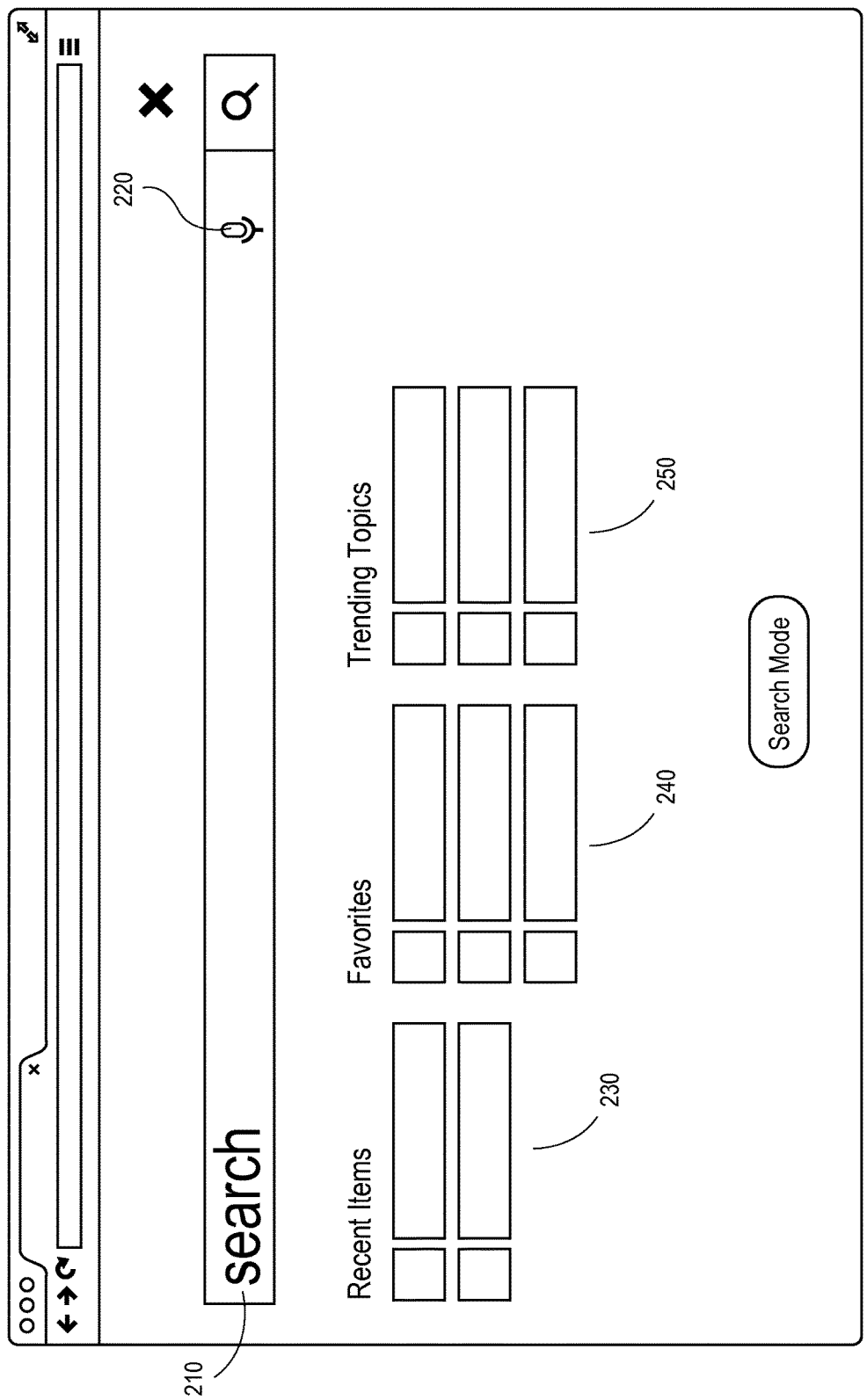
FIGS. 2-14 are graphical illustrations of various search
screens having functionality that may be provided by a
system utilizing the search functionality as described herein.

FIG. 2 is a graphical illustration of a search screen having
shortcut lists that may be provided by a system utilizing the
search functionality as described herein. In one embodiment,
the search screen is accessible via a browser application;
however, other applications may provide similar search
functionality. Search dialog box 210 may be utilized for entering search terms. Search terms may be entered by typing or otherwise providing input through an input device.

In one embodiment, audio input trigger 220 may be utilized to provide audio input (e.g., speech input) to dialog box 210. Any speech-to-text technology may be used to receive speech inputs and enter them into dialog box 210. In one embodiment, the search screen may provide other useful links or shortcuts. For example, the search screen may include one or more recently accessed items 230. In one embodiment, recently accessed items 230 may include, for example, recently opened, edited and/or viewed database objects.

In one embodiment, a cache is maintained of up to a pre-selected number records per object type (i.e. up to 100 accounts, up to 100 contacts, up to 100 custom object records for each custom object, etc.) for each use in recently accessed items 230. Access to a subset of these objects may be provided via links or other mechanisms on the search screen. When the user searches, this list may be used as the basis for auto-complete to show the user records they have recently viewed, edited, or looked up so that the user can short-cut to that record by selecting a record from the list. In alternate embodiments, different cache sizes may be maintained (e.g., 50 records per object type, 100 total records, 250 records per object type).

In one embodiment, auto-complete fills in results that match the string that a user has typed as the user is typing. Auto-complete, in one embodiment, uses both a user's recent items, which are records that they have recently viewed, edited or looked up and associated to a record, and a user's recent searches, which are the search terms the user has executed searches on.

Auto-complete on recent items affords the user the opportunity to quickly access records that are in regular use quickly, bypassing search and taking the user straight to the detail page for a record if they select it from the auto-complete drop down. This brings context to the search function because the behavior is based on user history. In one embodiment, as the user types, the list is progressively refined to match the string the user has typed.

In one embodiment, the search screen may include one or more favorite items 240. In one embodiment, favorite items 240 may include, for example, frequently opened, edited and/or viewed database objects. Favorite items 240 may be automatically determined by monitoring and analyzing a user's past search activity and/or favorite items 240 may be designated by the user for inclusion on the search screen.

In one embodiment, the search screen may include one or more trending topics 250. In one embodiment, trending topics 250 may include, for example, frequently opened, edited and/or viewed database objects, terms, search strings, files and/or actions for multiple users within a group. Trending topics 250 may be automatically determined by monitoring and analyzing a group's past search activity and/or trending topics 250 may be designated by one or more users within the group for inclusion on the search screen.

In one embodiment, natural language speech recognition may be utilized with the search screen to provide input to dialog box 210 to provide a more natural and intuitive search experience for the user.

Figure 3:
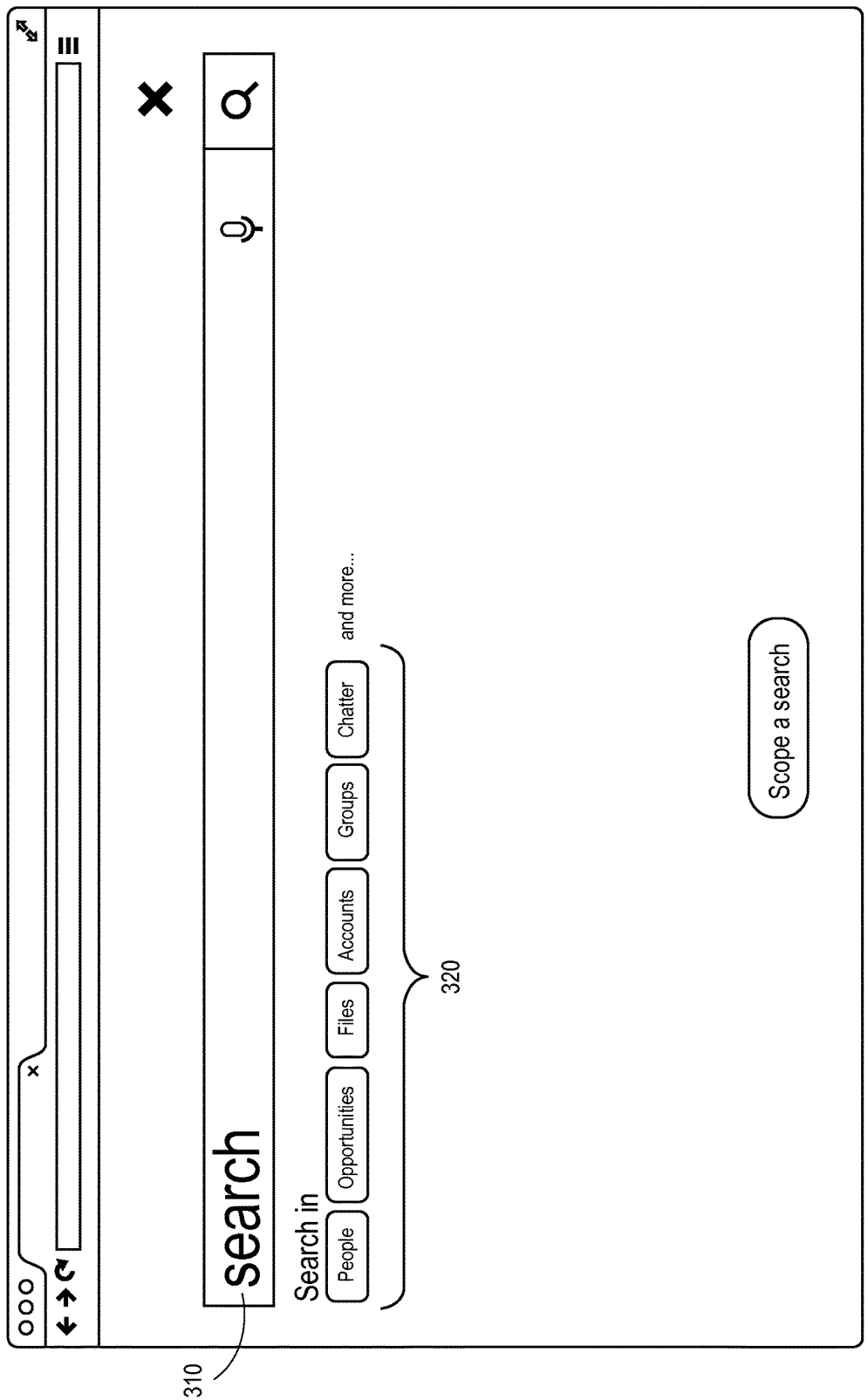

FIG. 3 is a graphical illustration of a search screen having object type filters that may be provided by a system utilizing the search functionality as described herein. In one embodiment, the search screen is accessible via a browser application; however, other applications may provide similar search functionality. Search dialog box 310 may be utilized for entering search terms.

Object type filtering may be accomplished by providing object filter buttons 320, for example, to allow a user to select the object types to be included in the search results. The object types available may be dependent upon the types of data stored in the database to be searched. In the example of FIG. 3, object types, such as people, opportunities, files, accounts, groups and/or social media (e.g., Chatter) may be included in, or excluded from, the search results by using buttons or other mechanisms on the search screen.

Figure 4:
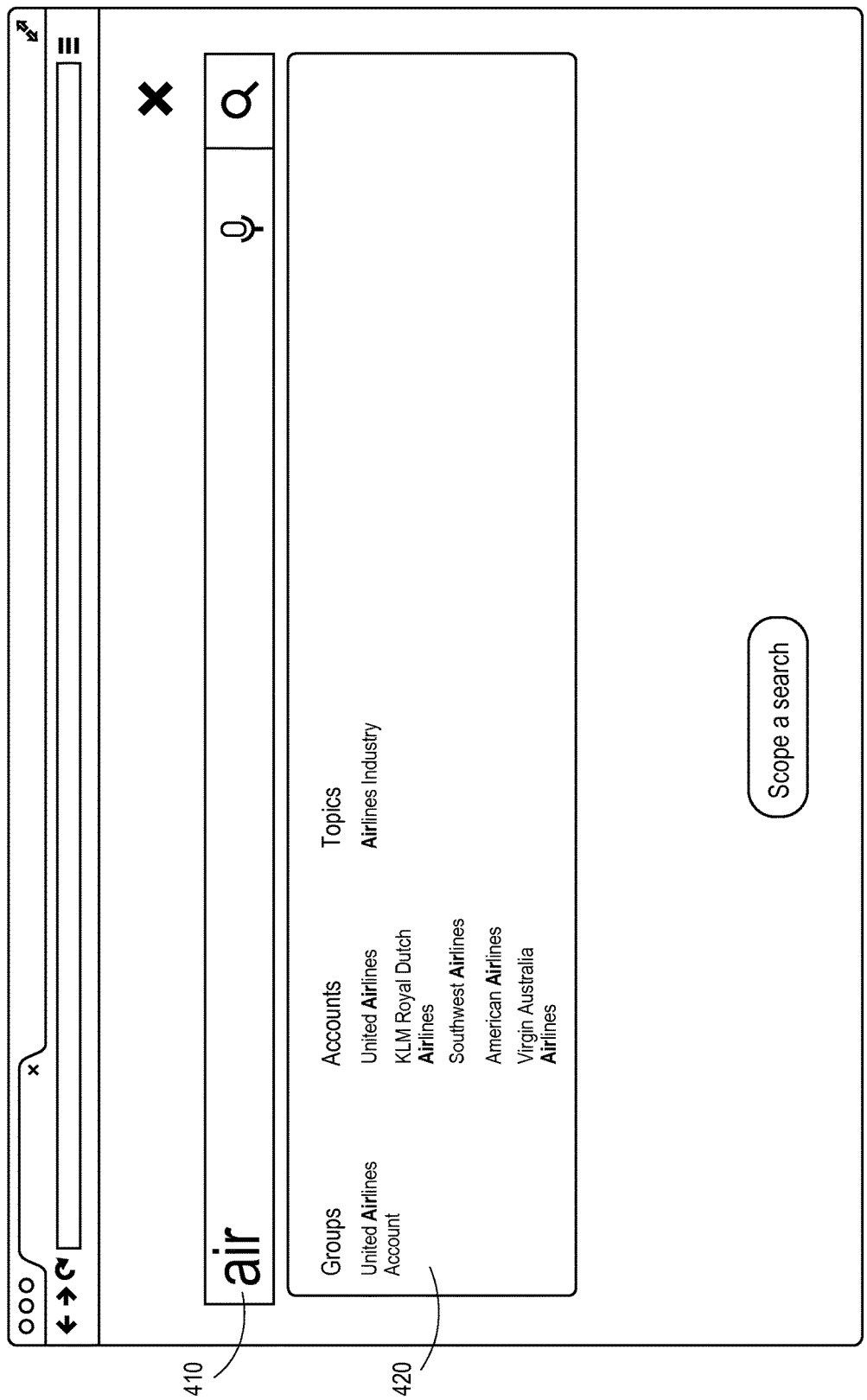

FIG. 4 is a graphical illustration of a search screen having a search input with suggested results provided by a system utilizing the search functionality as described herein. In the example of FIG. 4, "air" has been entered into dialog box 410. This may be a partial or a complete search and may have been entered by a keyboard or other alphanumeric input or via speech input.

In response to the input, the search mechanism can provide results 420. In one embodiment, results 420 can be organized by type. In the example of FIG. 4, the types can include groups, accounts and topics. These are merely example types and many other types can also be supported. Selecting (e.g., clicking) one of the results would take a user to the selected object. For example, selecting a result in the group list may take the user to a group page that provides further navigation options, or may take the user to a group information/summary page.

As another example, selecting a result in the account list may take the user to an account page that provides further navigation options within the specified account, or may take the user to an account information/summary page. As another example, selecting a result in the topic list may take the user to a social media or other information page that provides further information on the topic.

Figure 5:
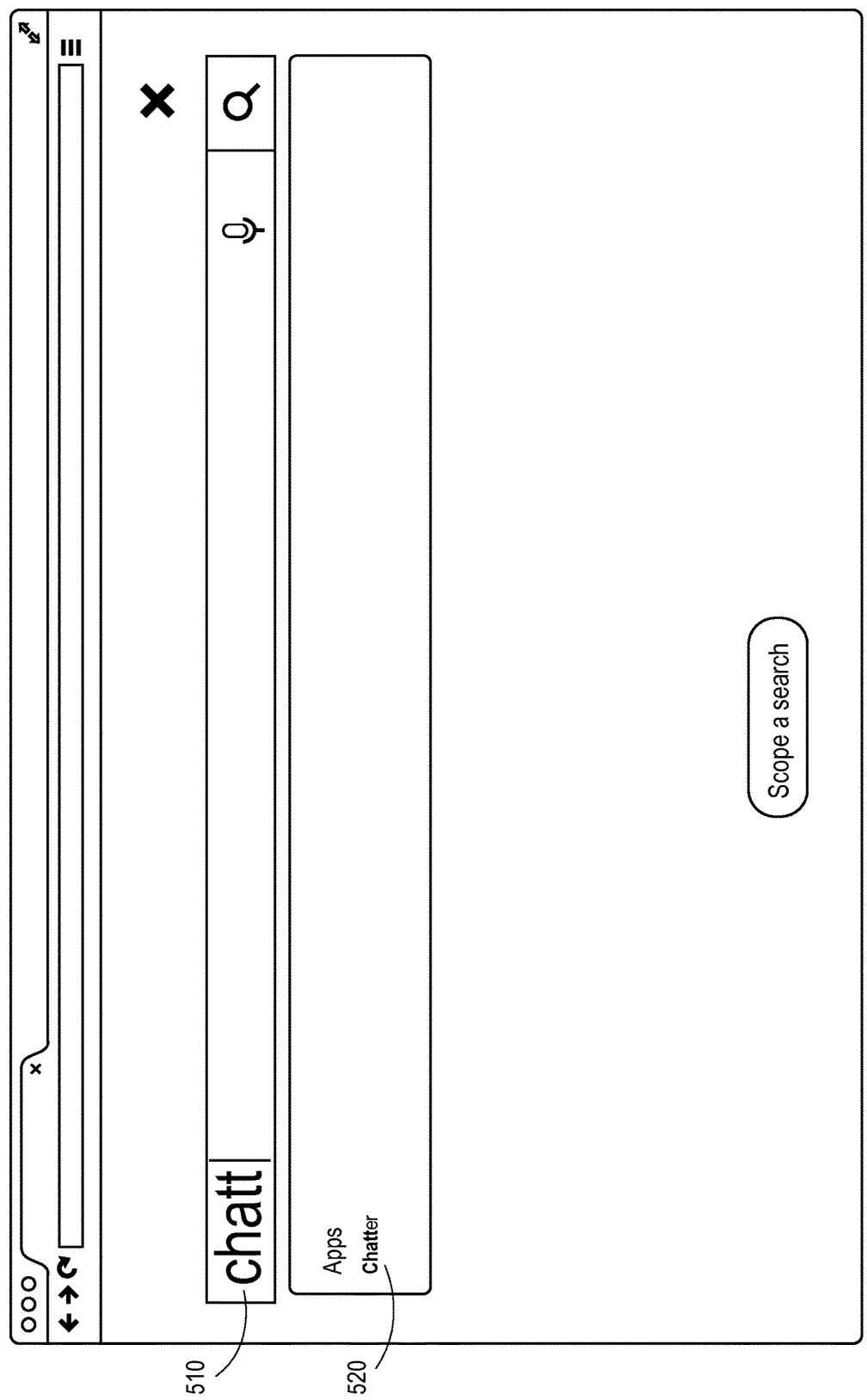

FIG. 5 is a graphical illustration of a search screen having a search input with suggested results provided by a system utilizing the search functionality as described herein. In the example of FIG. 5, "chatt" has been entered into dialog box 510. This may be a partial or a complete search and may have been entered by a keyboard or other alphanumeric input or via speech input. In response the search screen displays an app 520 having a name/title that matches the string in dialog box 510. Clicking or otherwise selecting the app may launch the app and allow the user to use the corresponding functionality.

Figure 6:
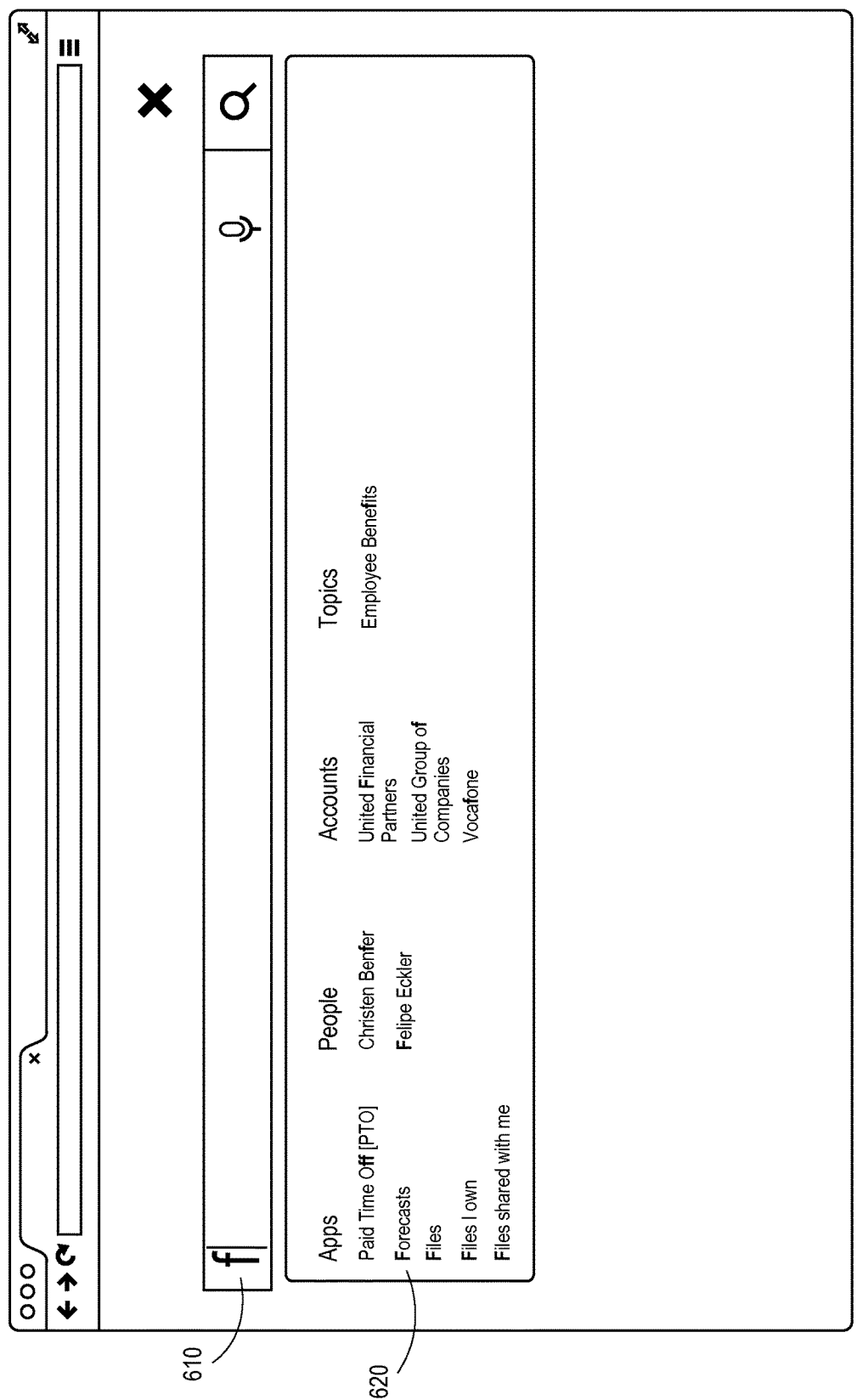

FIG. 6 is a graphical illustration of a search screen having a search input with suggested results provided by a system utilizing the search functionality as described herein. In the example of FIG. 6, "f" has been entered into dialog box 610. This may be a partial or a complete search and may have been entered by a keyboard or other alphanumeric input or via speech input.

In response the search screen displays suggested results, 620, organized by type as well as an app having a name/title that matches the string in dialog box 610. The user may access results 620 as described above.

Figure 7:
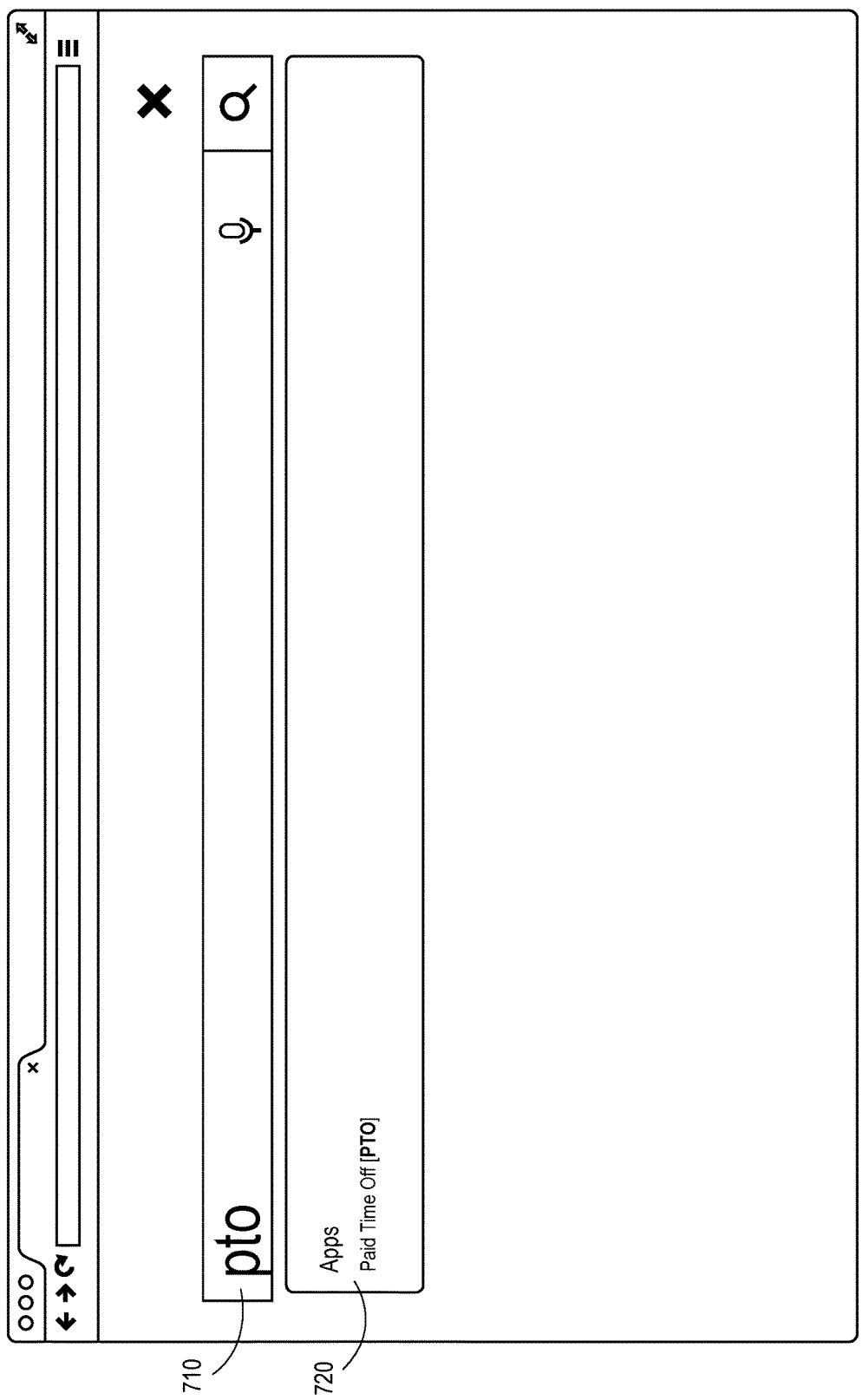

FIG. 7 is a graphical illustration of a search screen having a search input with suggested results provided by a system utilizing the search functionality as described herein. In the example of FIG. 7, "pto" has been entered into dialog box 710. This may be a partial or a complete search and may have been entered by a keyboard or other alphanumeric input or via speech input. Suggested results 720 corresponding to an app for paid time off (PTO) is provided to the user.

Figure 8:
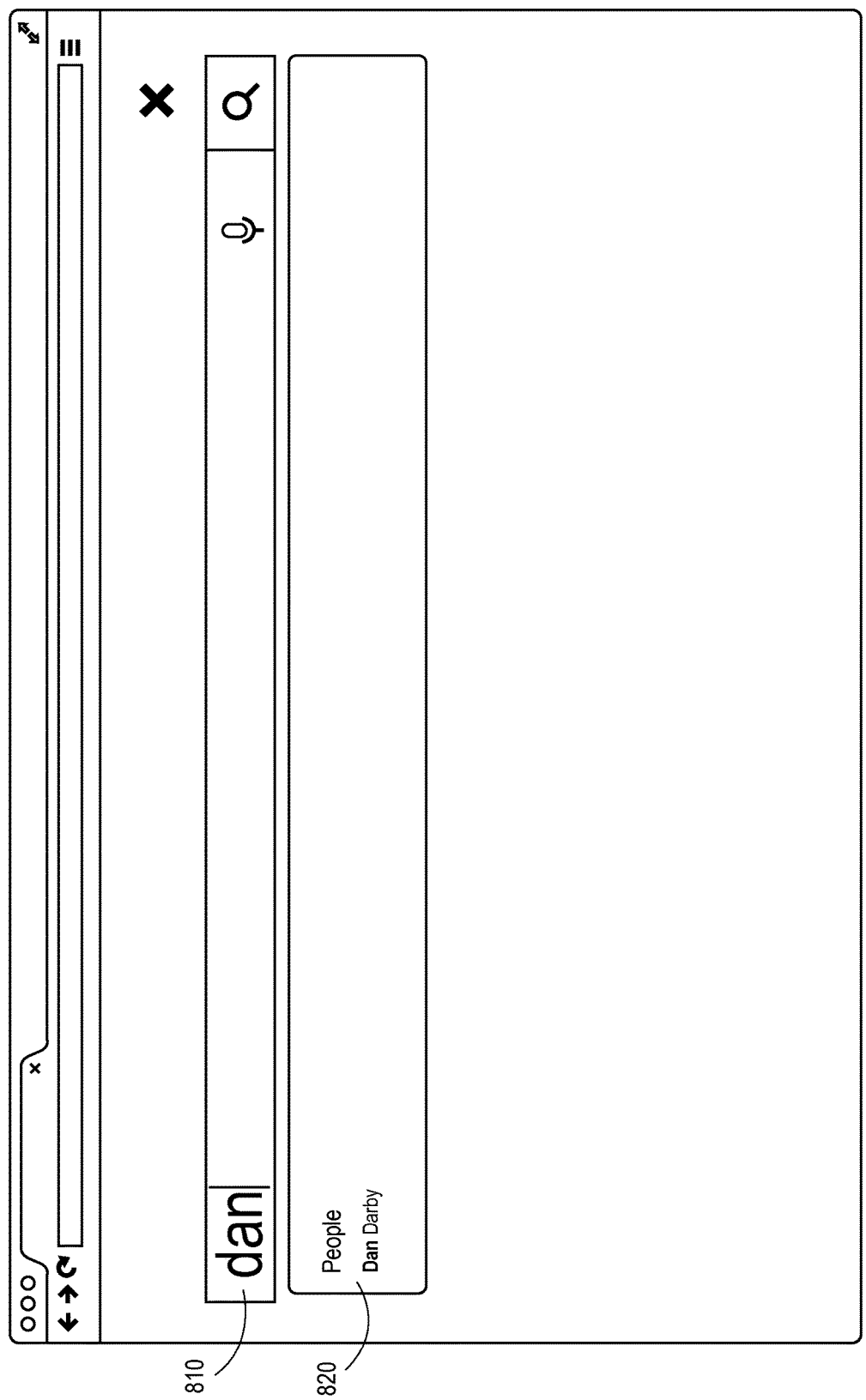

FIG. 8 is a graphical illustration of a search screen having a search input with suggested results provided by a system utilizing the search functionality as described herein. In the example of FIG. 8, "dan" has been entered into dialog box

810. This may be a partial or a complete search and may have been entered by a keyboard or other alphanumeric input or via speech input. Suggested results 820 corresponding to an object for a person named "Dan" is provided to the user.

Figure 9:
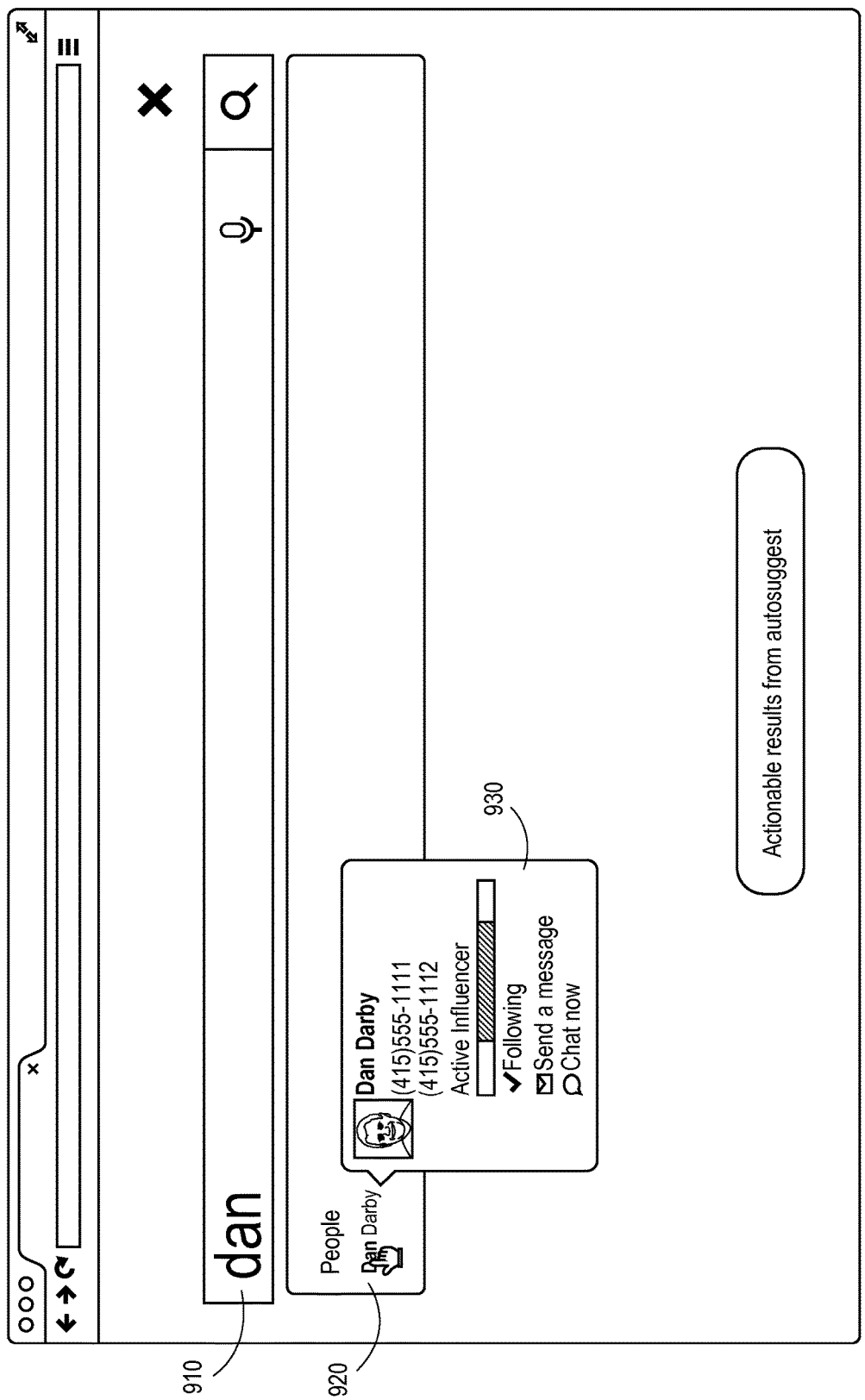

FIG. 9 is a graphical illustration of a search screen having a search input with suggested results provided by a system utilizing the search functionality as described herein. In the example of FIG. 9, "dan" has been entered into dialog box 910. This may be a partial or a complete search and may have been entered by a keyboard or other alphanumeric input or via speech input. Suggested results 920 corresponding to an object for a person named "Dan" is provided to the user.

In one embodiment, the user may be provided with a preview, 930, of the object in suggested results 920 without requiring the user to fully access the object. For example, when a cursor is over or near an object in results 920, a popup window may be provided with selected information from the object. Other preview mechanisms may also be utilized.

Figure 10:
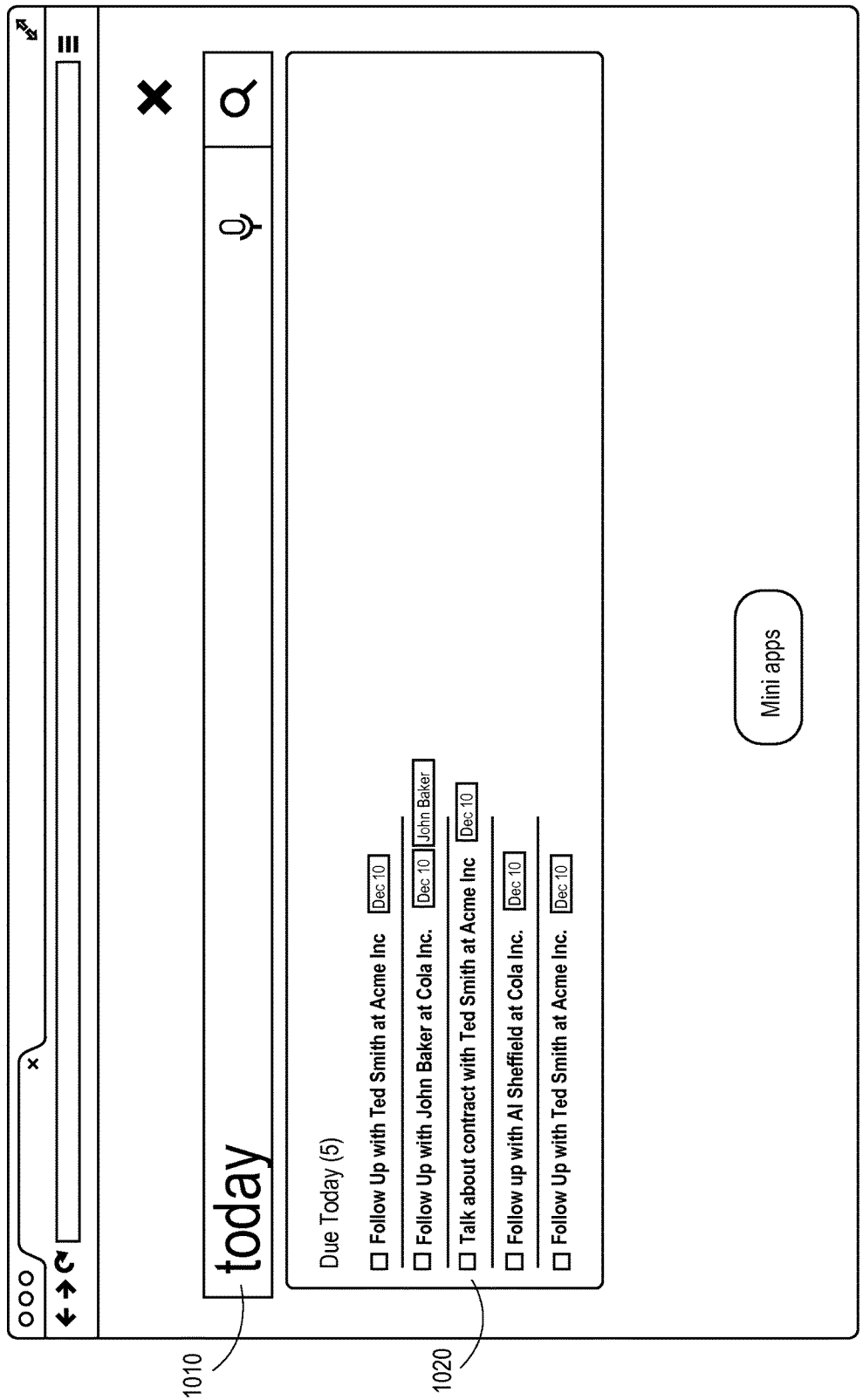

FIG. 10 is a graphical illustration of a search screen having a search input with suggested results provided by a system utilizing the search functionality as described herein. In the example of FIG. 10, "today" has been entered into dialog box 1010. This may be a partial or a complete search and may have been entered by a keyboard or other alphanumeric input or via speech input. Suggested results 1020 corresponding to items due that day is provided to the user.

In one embodiment, one or more preselected terms and/or phrases (e.g., today, tomorrow, yesterday, this week, next week) can be used to trigger a more complex search and provide results to the user via the search screen. For example, a user may enter the term "today" by any appropriate mechanism (e.g., typing, speech) and suggested results 1020 may provide all to do items due that day. Other results may also be provided. For example, in response to a "today" input, contact birthdays, news items or social media updates for selected entities may be provided.

That is, a preselected input may be used to trigger a more complex search that is not merely a suggested search or result. The preselected input may operate as a trigger or a macro to provide useful results to the user. Other examples may be non-temporal, such as, "news" may provide headlines or "scores" may provide sports scores.

Figure 11:
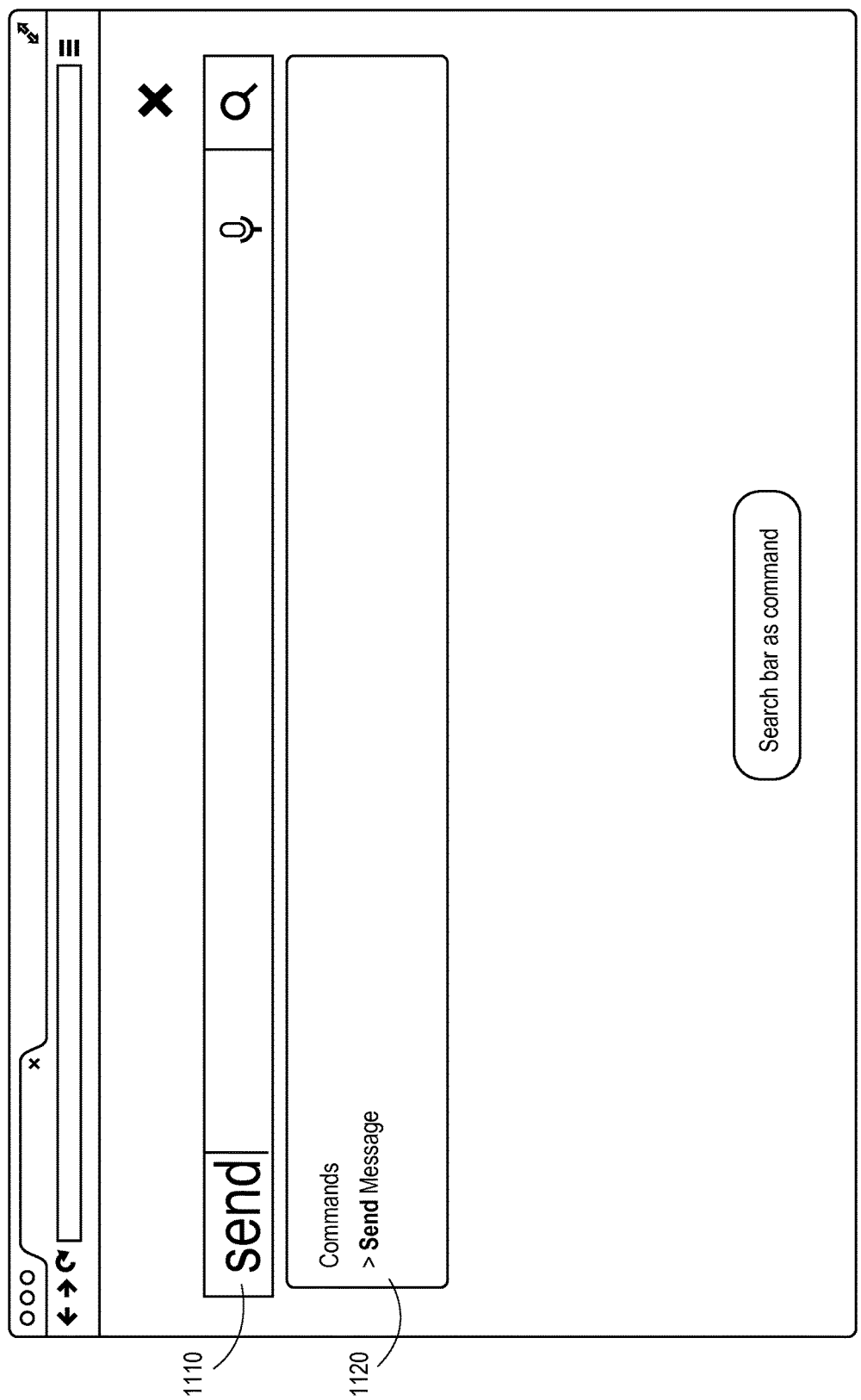

FIG. 11 is a graphical illustration of a search screen having a search input with suggested results provided by a system utilizing the search functionality as described herein. In the example of FIG. 11, "send" has been entered into dialog box 1110. This may be a partial or a complete search and may have been entered by a keyboard or other alphanumeric input or via speech input.

Suggested results 1120 corresponding to a command matching the input to dialog box 1110 can be provided via the search screen. In the example of FIG. 11, entering "send" may provide a shortcut to sending a message and/or any other command that includes sending information. Selecting the command from search results 1120 causes the command to be performed without the user being required to navigate to another screen and/or application to accomplish the results.

Figure 12:
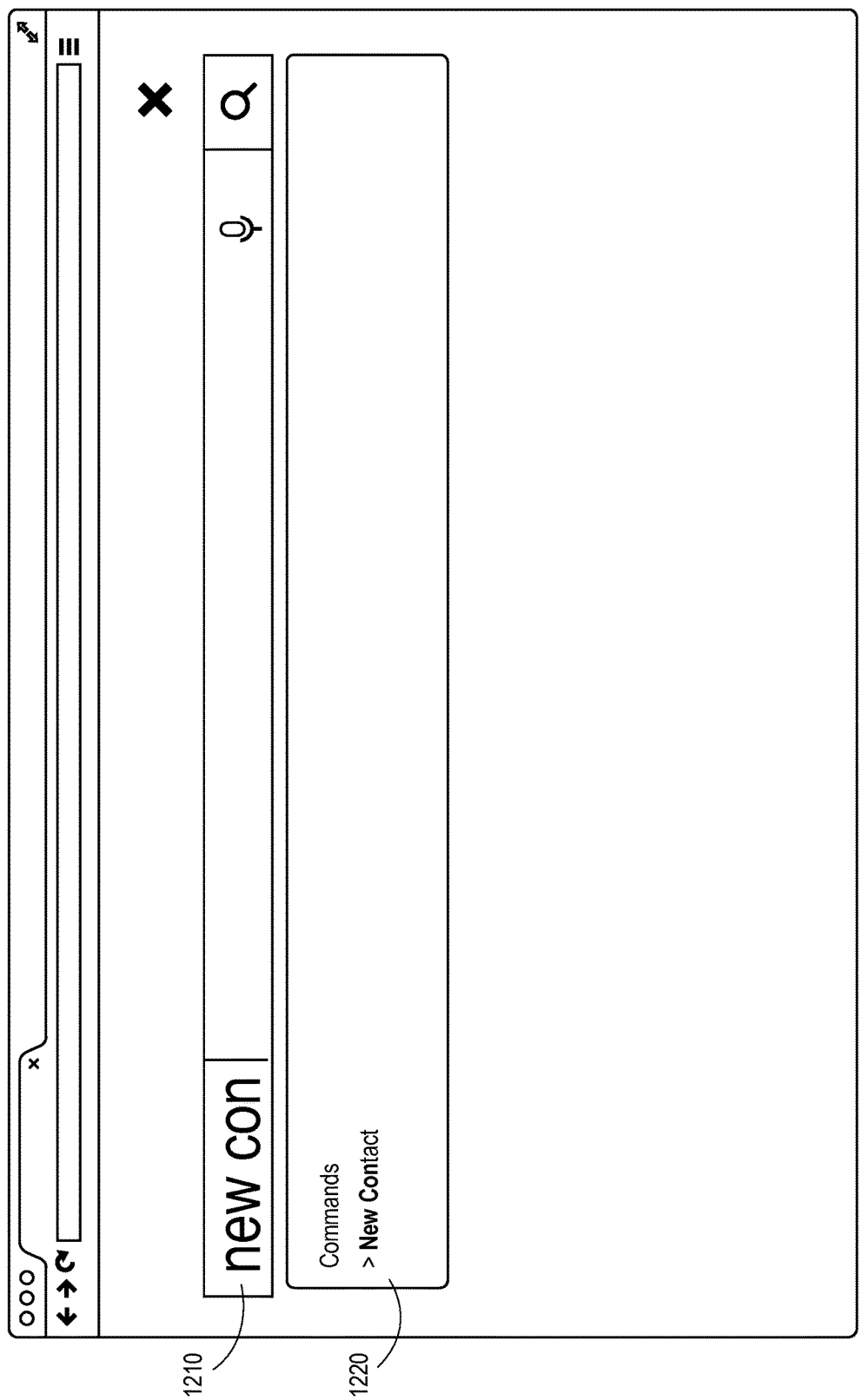

FIG. 12 is a graphical illustration of a search screen having a search input with suggested results provided by a system utilizing the search functionality as described herein. In the example of FIG. 12, "new con" has been entered into dialog box 1210. This may be a partial or a complete search and may have been entered by a keyboard or other alphanumeric input or via speech input.

Suggested results 1220 corresponding to a command matching the input to dialog box 1210 can be provided via the search screen. In the example of FIG. 12, entering "new con" may provide a shortcut to creating a new contact and/or accessing a newly created contact. Selecting the command from search results 1220 causes the selected command to be performed without the user being required to navigate to another screen and/or application to accomplish the results.

Figure 13:
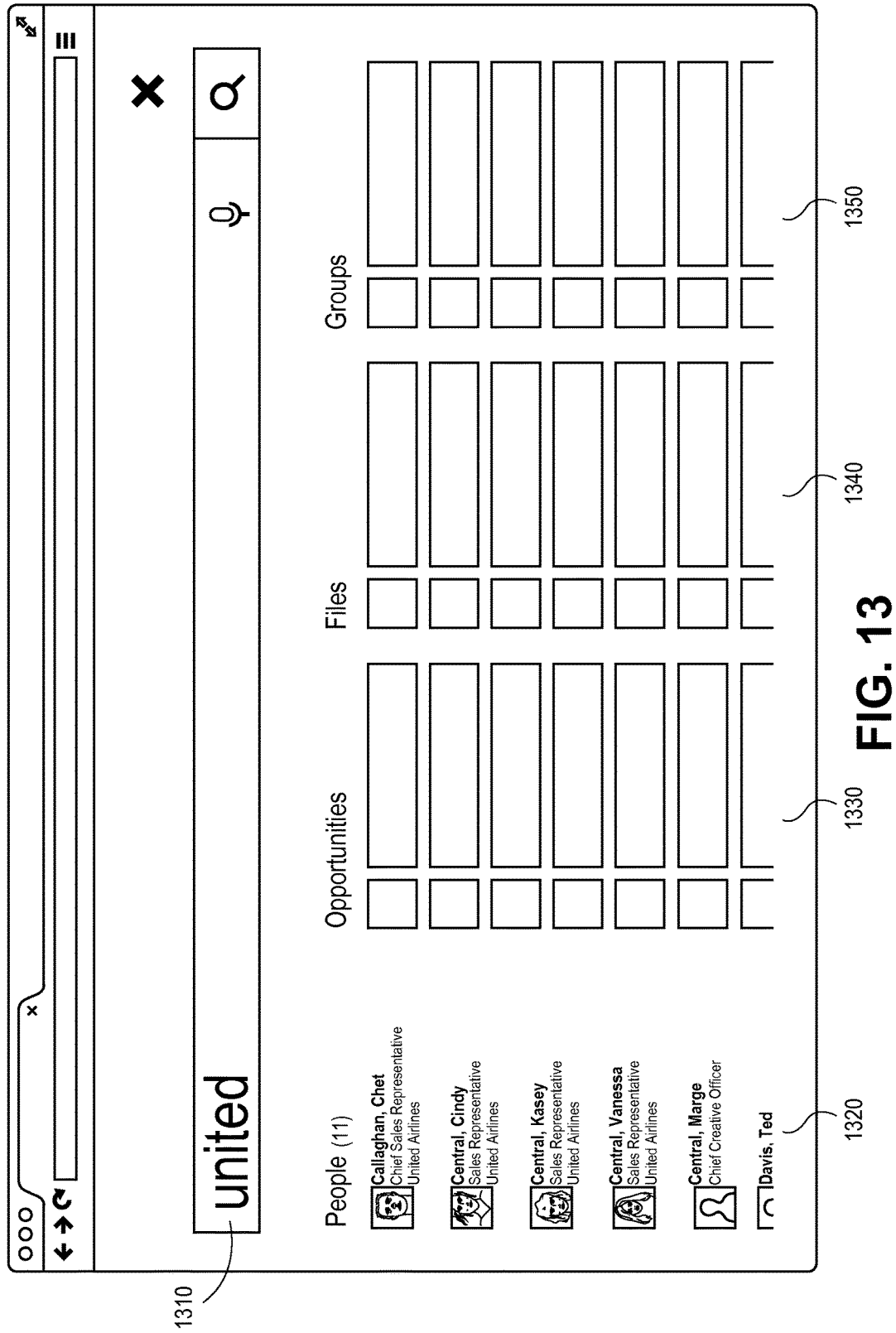

FIG. 13 is a graphical illustration of a search screen having a search input with suggested results provided by a system utilizing the search functionality as described herein. In the example of FIG. 13, "united" has been entered into dialog box 1310. This may be a partial or a complete search and may have been entered by a keyboard or other alphanumeric input or via speech input.

Suggested people results 1320 corresponding to a command matching the input to dialog box 1310 can be provided via the search screen. In the example of FIG. 13, entering "united" may provide a list of contacts having "united" in a name, title and/or organization. A similar listing can be provided by opportunities 1330, files 1340 and/or groups 1350. Other listings and/or organization can also be used.

Figure 14:
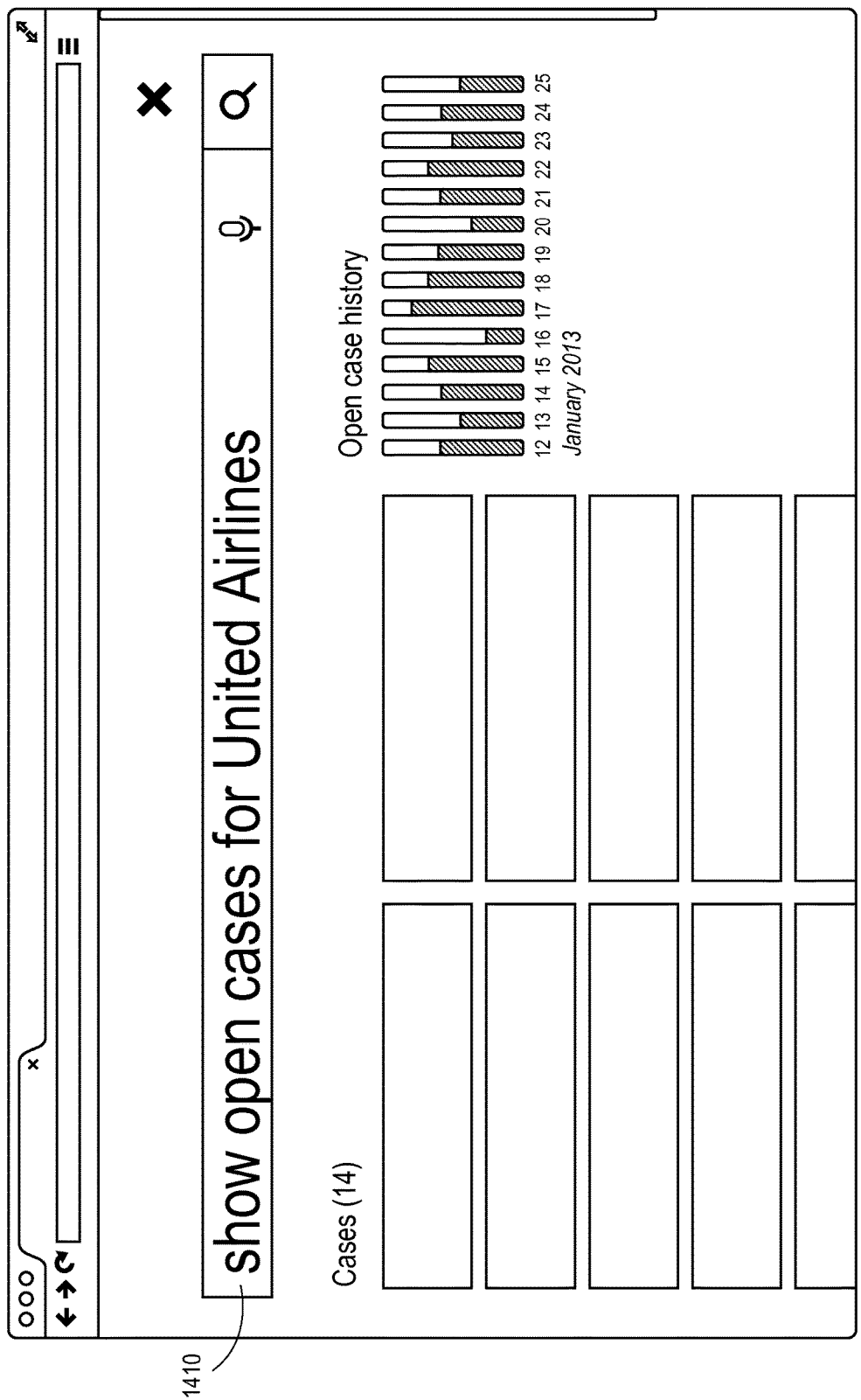

FIG. 14 is a graphical illustration of a search screen having a search input with suggested results provided by a system utilizing the search functionality as described herein. In the example of FIG. 14, "show open cases for United Airlines" has been entered into dialog box 1410. This may be a partial or a complete search and may have been entered by a keyboard or other alphanumeric input or via speech input. In one embodiment, phrases like this can be parsed and results can be provided to answer the user's query.

This mechanism allows the user to receive the requested information in a more natural manner than would otherwise be possible. The user may receive a report or other more complex information directly through a search screen rather than generating the report or navigating to a shortcut or other mechanism to access the report. This may be accomplished by parsing the string in dialog box 1410 and determining whether the requested information can be acquired and/or compiled and presented on the search screen.

Figure 15:
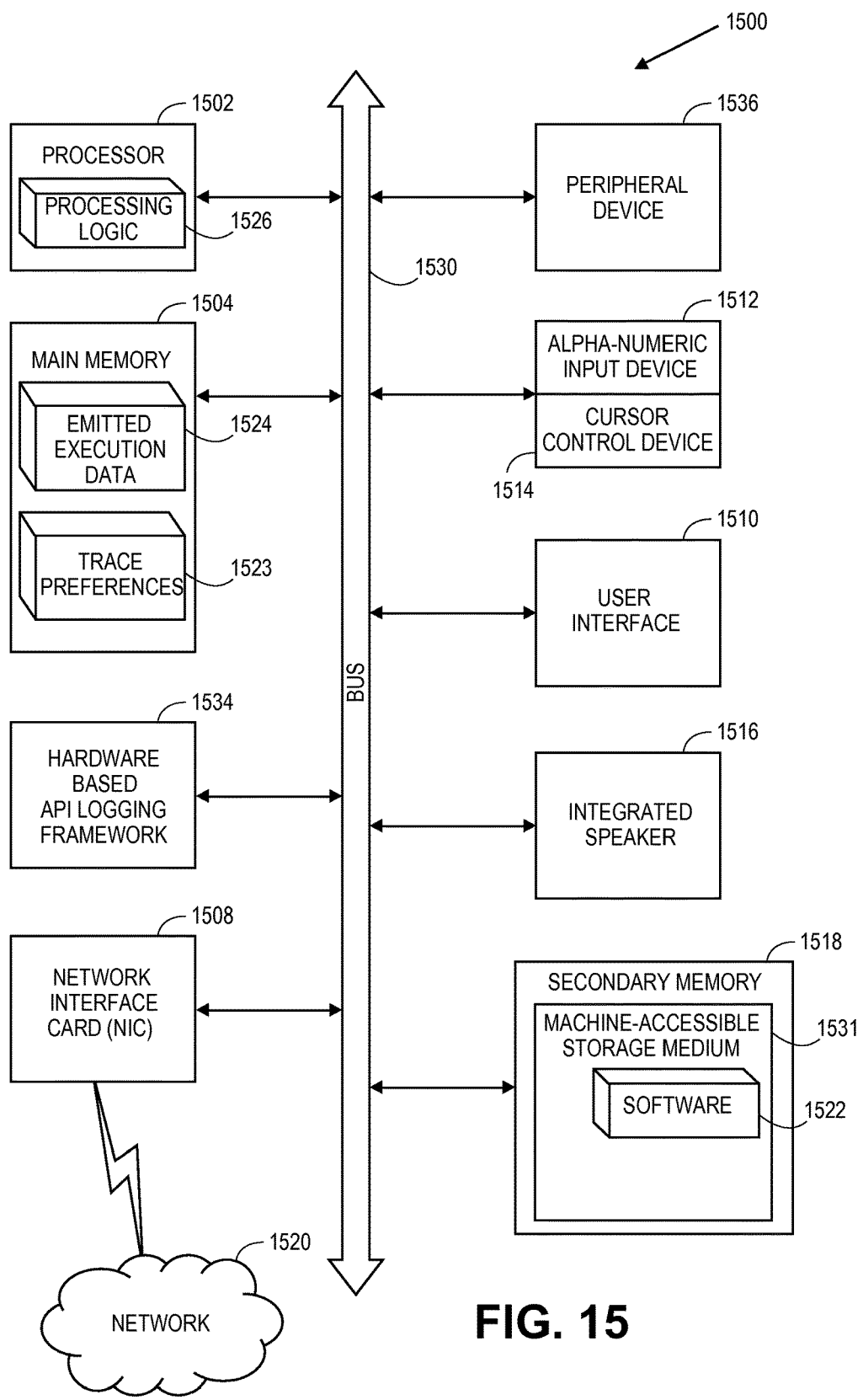
FIG. 15 illustrates a computer system according to one
embodiment.

FIG. 15 illustrates a diagrammatic representation of a machine 1500 in the exemplary form of a computer system, in accordance with one embodiment, within which a set of instructions, for causing the machine 1500 to perform any one or more of the methodologies discussed herein, may be executed. In alternative embodiments, the machine may be connected (e.g., networked) to other machines in a Local Area Network (LAN), an intranet, an extranet, or the Internet.

The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1500 includes a processor 1502, a main memory 1504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1518 (e.g., a persistent storage device including hard disk drives and persistent multi-tenant data base implementations), which communicate with each other via a bus 1530. Main memory 1504 includes emitted execution data 1524 (e.g., data emitted by a logging framework) and one or more trace preferences 1523 which operate in conjunction with processing logic 1526 and processor 1502 to perform the methodologies discussed herein.

Processor 1502 represents one or more general-purpose processing devices such as a microprocessor, central processing unit, or the like. More particularly, the processor 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1502 may also be one or more special-purpose processing devices such as an application specific integrated circuit (ASIC), a field programmable gate array (FPGA), a digital signal processor (DSP), network processor, or the like.

The computer system 1500 may further include a network interface card 1508. The computer system 1500 also may include a user interface 1510 (such as a video display unit, a liquid crystal display (LCD), or a cathode ray tube (CRT)), an alpha-numeric input device 1512 (e.g., a keyboard), a cursor control device 1514 (e.g., a mouse), and a signal generation device 1516 (e.g., an integrated speaker). The computer system 1500 may further include peripheral device 1536 (e.g., wireless or wired communication devices, memory devices, storage devices, audio processing devices, video processing devices, etc. The computer system 1500 may further include a Hardware based API logging framework 1534 capable of executing incoming requests for services and emitting execution data responsive to the fulfillment of such incoming requests.

The secondary memory 1518 may include a machine-readable storage medium (or more specifically a machine-accessible storage medium) 1531 on which is stored one or more sets of instructions. The software 1522 may also reside, completely or at least partially, within the main memory 1504 and/or within the processor 1502 during execution thereof by the computer system 1500, the main memory 1504 and the processor 1502 also constituting machine-readable storage media. The software 1522 may further be transmitted or received over a network 1520 via the network interface card 1508. The machine-accessible storage medium 1531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 16:
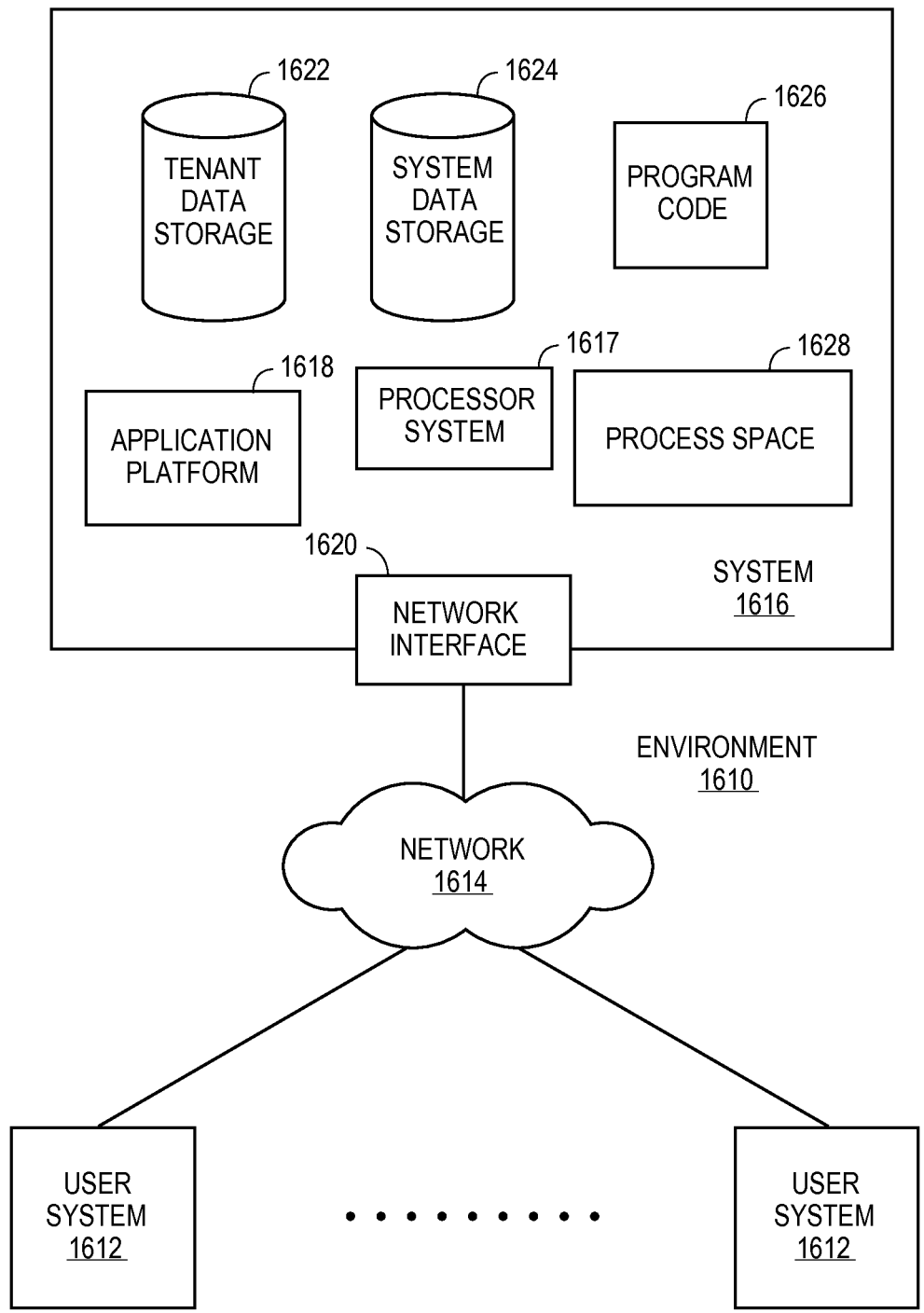
FIG. 16 illustrates a block diagram of an environment
wherein an on-demand database service might be used
according to one embodiment.

FIG. 16 illustrates a block diagram of an environment 1610 wherein an on-demand database service might be used. Environment 1610 may include user systems 1612, network 1614, system 1616, processor system 1617, application platform 1618, network interface 1620, tenant data storage 1622, system data storage 1624, program code 1626, and process space 1628. In other embodiments, environment 1610 may not have all of the components listed and/or may have other elements instead of, or in addition to, those listed above.

Environment 1610 is an environment in which an on-demand database service exists. User system 1612 may be any machine or system that is used by a user to access a database user system. For example, any of user systems 1612 can be a handheld computing device, a mobile phone, a laptop computer, a work station, and/or a network of computing devices. As illustrated in herein FIG. 16 (and in more detail in FIG. 17) user systems 1612 might interact via a network 1614 with an on-demand database service, which is system 1616.

An on-demand database service, such as system 1616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1616" and "system 1616" will be used interchangeably herein. A database image may include one or more database objects. A relational database management system (RDMS) or the equivalent may execute storage and retrieval of information against the database object(s). Application platform 1618 may be a framework that allows the applications of system 1616 to run, such as the hardware and/or software, e.g., the operating system. In an embodiment, on-demand database service 1616 may include an application platform 1618 that enables creation, managing and executing one or more applications developed by the provider of the on-demand database service, users accessing the on-demand database service via user systems 1612, or third party application developers accessing the on-demand database service via user systems 1612.

The users of user systems 1612 may differ in their respective capacities, and the capacity of a particular user system 1612 might be entirely determined by permissions (permission levels) for the current user. For example, where a salesperson is using a particular user system 1612 to interact with system 1616, that user system has the capacities allotted to that salesperson. However, while an administrator is using that user system to interact with system 1616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1614 is any network or combination of networks of devices that communicate with one another. For example, network 1614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1612 might communicate with system 1616 using TCP/IP and, at a higher network level, use other common Internet protocols to communicate, such as HTTP, FTP, AFS, WAP, etc. In an example where HTTP is used, user system 1612 might include an HTTP client commonly referred to as a "browser" for sending and receiving HTTP messages to and from an HTTP server at system 1616. Such an HTTP server might be implemented as the sole network interface between system 1616 and network 1614, but other techniques might be used as well or instead. In some implementations, the interface between system 1616 and network 1614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1616, shown in FIG. 16, implements a web-based customer relationship management (CRM) system. For example, in one embodiment, system 1616 includes application servers configured to implement and execute CRM software applications as well as provide related data, code, forms, webpages and other information to and from user systems 1612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1616 implements applications other than, or in addition to, a CRM application. For example, system 1616 may provide tenant access to multiple hosted (standard and custom) applications, including a CRM application. User (or third party developer) applications, which may or may not include CRM, may be supported by the application platform 1618, which manages creation, storage of the applications into one or more database objects and executing of the applications in a virtual machine in the process space of the system 1616.

One arrangement for elements of system 1616 is shown in FIG. 16, including a network interface 1620, application platform 1618, tenant data storage 1622 for tenant data 1623 (of FIG. 17), system data storage 1624 for system data 1625 (of FIG. 17) accessible to system 1616 and possibly multiple tenants, program code 1626 for implementing various functions of system 1616, and a process space 1628 for executing MTS system processes and tenant-specific processes, such as running applications as part of an application hosting service. Additional processes that may execute on system 1616 include database indexing processes.

Several elements in the system shown in FIG. 16 include conventional, well-known elements that are explained only briefly here. For example, each user system 1612 could include a desktop personal computer, workstation, laptop, PDA, cell phone, or any wireless access protocol (WAP) enabled device or any other computing device capable of interfacing directly or indirectly to the Internet or other network connection. User system 1612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1612 to access, process and view information, pages and applications available to it from system 1616 over network 1614. Each user system 1612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1616 or other systems or servers. For example, the user interface device can be used to access data and applications hosted by system 1616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1612 and all of its components are operator configurable using applications, such as a browser, including computer code run using a central processing unit such as an Intel Pentium® processor or the like. Similarly, system 1616 (and additional instances of an MTS, where more than one is present) and all of their components might be operator configurable using application(s) including computer code to run using a central processing unit such as processor system 1617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1616 is configured to provide webpages, forms, applications, data and media content to user (client) systems 1612 to support the access by user systems 1612 as tenants of system 1616. As such, system 1616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 17:
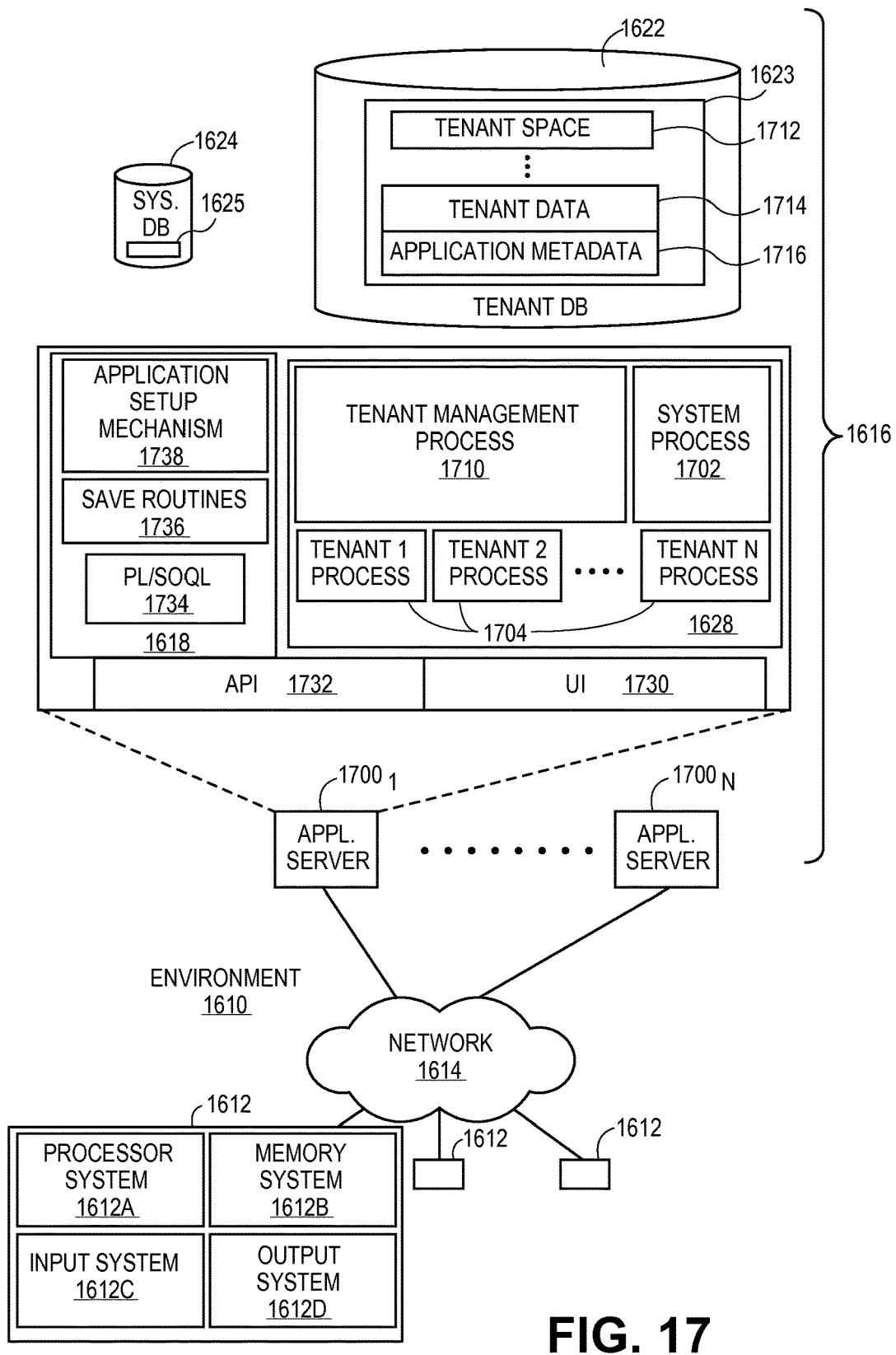
FIG. 17 illustrates a block diagram of an embodiment of
elements of environment of FIG. 16 and various possible
interconnections between these elements according to one
embodiment.

FIG. 17 also illustrates environment 1610. However, in FIG. 17 elements of system 1616 and various interconnections in an embodiment are further illustrated. FIG. 17 shows that user system 1612 may include processor system 1612A, memory system 1612B, input system 1612C, and output system 1612D. FIG. 17 shows network 1614 and system 1616. FIG. 17 also shows that system 1616 may include tenant data storage 1622, tenant data 1623, system data storage 1624, system data 1625, User Interface (UI) 1730, Application Program Interface (API) 1732, PL/SOQL 1734, save routines 1736, application setup mechanism 1738, applications servers $1700_1$-$700_N$, system process space 1702, tenant process spaces 1704, tenant management process space 1710, tenant storage space 1712, tenant data 1714, and application metadata 1716. In other embodiments, environment 1610 may not have the same elements as those listed above and/or may have other elements instead of, or in addition to, those listed above.

User system 1612, network 1614, system 1616, tenant data storage 1622, and system data storage 1624 were discussed above in FIG. 16. Regarding user system 1612, processor system 1612A may be any combination of one or more processors. Memory system 1612B may be any combination of one or more memory devices, short term, and/or long term memory. Input system 1612C may be any combination of input devices, such as one or more keyboards, mice, trackballs, scanners, cameras, and/or interfaces to networks. Output system 1612D may be any combination of output devices, such as one or more monitors, printers, and/or interfaces to networks. As shown by FIG. 17, system 1616 may include a network interface 1620 (of FIG. 16) implemented as a set of HTTP application servers 1700, an application platform 1618, tenant data storage 1622, and system data storage 1624. Also shown is system process space 1702, including individual tenant process spaces 1704 and a tenant management process space 1710. Each application server 1700 may be configured to tenant data storage 1622 and the tenant data 1623 therein, and system data storage 1624 and the system data 1625 therein to serve requests of user systems 1612. The tenant data 1623 might be divided into individual tenant storage spaces 1712, which can be either a physical arrangement and/or a logical arrangement of data. Within each tenant storage space 1712, tenant data 1714 and application metadata 1716 might be similarly allocated for each user. For example, a copy of a user's most recently used (MRU) items might be stored to tenant data 1714. Similarly, a copy of MRU items for an entire organization that is a tenant might be stored to tenant storage space 1712. A UI 1730 provides a user interface and an API 1732 provides an application programmer interface to system 1616 resident processes to users and/or developers at user systems 1612. The tenant data and the system data may be stored in various databases, such as one or more Oracle™ databases.

Application platform 1618 includes an application setup mechanism 1738 that supports application developers' creation and management of applications, which may be saved as metadata into tenant data storage 1622 by save routines 1736 for execution by subscribers as one or more tenant process spaces 1704 managed by tenant management process 1710 for example. Invocations to such applications may be coded using PL/SOQL 1734 that provides a programming language style interface extension to API 1732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1716 for the subscriber making the invocation and executing the metadata as an application in a virtual machine.

Each application server 1700 may be communicably coupled to database systems, e.g., having access to system data 1625 and tenant data 1623, via a different network connection. For example, one application server 1700₁ might be coupled via the network 1614 (e.g., the Internet), another application server 1700$_{N-1}$ might be coupled via a direct network link, and another application server 1700$_N$ might be coupled by yet a different network connection. Transfer Control Protocol and Internet Protocol (TCP/IP) are typical protocols for communicating between application servers 1700 and the database system. However, it will be apparent to one skilled in the art that other transport protocols may be used to optimize the system depending on the network interconnect used.

In certain embodiments, each application server 1700 is configured to handle requests for any user associated with any organization that is a tenant. Because it is desirable to be able to add and remove application servers from the server pool at any time for any reason, there is preferably no server affinity for a user and/or organization to a specific application server 1700. In one embodiment, therefore, an interface system implementing a load balancing function (e.g., an F5 Big-IP load balancer) is communicably coupled between the application servers 1700 and the user systems 1612 to distribute requests to the application servers 1700. In one embodiment, the load balancer uses a least connections algorithm to route user requests to the application servers 1700. Other examples of load balancing algorithms, such as round robin and observed response time, also can be used. For example, in certain embodiments, three consecutive requests from the same user could hit three different application servers 1700, and three requests from different users could hit the same application server 1700. In this manner, system 1616 is multi-tenant, wherein system 1616 handles storage of, and access to, different objects, data and applications across disparate users and organizations.

As an example of storage, one tenant might be a company that employs a sales force where each salesperson uses system 1616 to manage their sales process. Thus, a user might maintain contact data, leads data, customer follow-up data, performance data, goals and progress data, etc., all applicable to that user's personal sales process (e.g., in tenant data storage 1622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1616 might also maintain system level data usable by multiple tenants or other data. Such system level data might include industry reports, news, postings, and the like that are sharable among tenants.

In certain embodiments, user systems 1612 (which may be client systems) communicate with application servers 1700 to request and update system-level and tenant-level data from system 1616 that may require sending one or more queries to tenant data storage 1622 and/or system data storage 1624. System 1616 (e.g., an application server 1700 in system 1616) automatically generates one or more SQL statements (e.g., one or more SQL queries) that are designed to access the desired information. System data storage 1624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
receiving a request for a search of objects within a multi-tenant database environment having a plurality of tenants each having individual tenant information, wherein the request is in response to input via a graphical user interface;
presenting, via the graphical user interface, a search screen having shortcut lists organized by type and based on aggregation across multiple users of individual tenants of the multi-tenant database environment, wherein the types include one or more tasks or application commands, frequently opened database objects, frequently edited database objects, frequently viewed database objects, wherein one or more shortcut lists provide access to one or more objects of the type within a corresponding shortcut list in response to selection of an object via the graphical user interface;
generating, with one or more processors, a multi-tenant database environment operation in response to a selection from the one or more shortcut lists, wherein the operation is specialized based on tenant information corresponding to the aggregation across multiple users of a tenant from which the request originates and is performed on the one or more objects of the type within the corresponding shortcut list in response to selection of an object via the graphical user interface, and wherein the aggregation tenant information is retrieved from the multi-tenant database environment;
performing, with the one or more processors, the operation on the one or more objects of the type within the corresponding shortcut list in response to selection of the object via the graphical user interface on information stored in a database of the multi-tenant database environment, wherein the selection of the object causes the operation or application commands to be performed without further navigation to another screen or application commands; and
presenting results of the operation in the graphical user interface.

2. The method of claim 1 wherein specializing the query comprises aggregating queries across multiple organizations in the multitenant database environment.

3. The method of claim 1 wherein specializing the query comprises aggregating queries across multiple groups in the multitenant database environment.

4. The method of claim 1 wherein specializing the query comprises customizing the query utilizing machine learning based on user behavior and user research.

5. The method of claim 1 wherein specializing the query comprises customizing the query utilizing heuristics based on user behavior and user research.

6. The method of claim 1 wherein specializing the query comprises optimizing the query based on user-specific trending topics.

7. The method of claim 1 wherein specializing the query comprises limiting the query to temporally-specific results based on temporal terms in the request.

8. The method of claim 1 wherein specializing the query comprises providing a shortcut to a function in response to a term in the request.

9. A non-transitory computer-readable medium having stored thereon instructions capable of, when executed by one or more processors, providing a multitenant environment to:
receive a request for a search of objects within a multi-tenant database environment having a plurality of tenants each having individual tenant information, wherein the request is in response to input via a graphical user interface;
present, via the graphical user interface, a search screen having shortcut lists organized by type and based on aggregation across multiple users of individual tenants of the multi-tenant database environment, wherein the types include one or more tasks or application commands, frequently opened database objects, frequently edited database objects, frequently viewed database objects, wherein one or more shortcut lists provide access to one or more objects of the type within a corresponding shortcut list in response to selection of an object via the graphical user interface;
generate, with one or more processors, a multi-tenant database environment operation in response to a selection from the one or more shortcut lists, wherein the operation is specialized based on tenant information corresponding to the aggregation across multiple users of a tenant from which the request originates and is performed on the one or more objects of the type within the corresponding shortcut list in response to selection of an object via the graphical user interface, and wherein the aggregation tenant information is retrieved from the multi-tenant database environment;
perform, with the one or more processors, the operation on the one or more objects of the type within the corresponding shortcut list in response to selection of the object via the graphical user interface on information stored in a database of the multi-tenant database environment, wherein the selection of the object causes the operation or application commands to be performed without further navigation to another screen or application commands; and
present results of the operation in the graphical user interface.

10. The non-transitory computer-readable medium of claim 9 wherein specializing the query comprises aggregating queries across multiple organizations in the multitenant database environment.

11. The non-transitory computer-readable medium of claim 9 wherein specializing the query comprises aggregating queries across multiple groups in the multitenant database environment.

12. The non-transitory computer-readable medium of claim 9 wherein specializing the query comprises customizing the query utilizing machine learning based on user behavior and user research.

13. The non-transitory computer-readable medium of claim 9 wherein specializing the query comprises customizing the query utilizing heuristics based on user behavior and user research.

14. The non-transitory computer-readable medium of claim 9 wherein specializing the query comprises optimizing the query based on user-specific trending topics.

15. The non-transitory computer-readable medium of claim 9 wherein specializing the query comprises limiting the query to temporally-specific results based on temporal terms in the request.

16. The non-transitory computer-readable medium of claim 9 wherein specializing the query comprises providing a shortcut to a function in response to a term in the request.

17. A system comprising:
   at least one memory device;
   one or more processors coupled with the at least one memory device, the one or more processors to receive a request for a search of objects within a multi-tenant database environment having a plurality of tenants each having individual tenant information, wherein the request is in response to input via a graphical user interface, to present, via the graphical user interface, a search screen having shortcut lists organized by type and based on aggregation across multiple users of individual tenants of the multi-tenant database environment, wherein the types include one or more tasks or application commands, frequently opened database objects, frequently edited database objects, frequently viewed database objects, wherein one or more shortcut lists provide access to one or more objects of the type within a corresponding shortcut list in response to selection of an object via the graphical user interface, to generate, with one or more processors, a multi-tenant database environment operation in response to a selection from the one or more shortcut lists, wherein the operation is specialized based on tenant information corresponding to the aggregation across multiple users of a tenant from which the request originates and is performed on the one or more objects of the type within the corresponding shortcut list in response to selection of an object via the graphical user interface, and wherein the aggregation tenant information is retrieved from the multi-tenant database environment, to perform, with the one or more processors, the operation on the one or more objects of the type within the corresponding shortcut list in response to selection of the object via the graphical user interface on information stored in a database of the multi-tenant database environment, wherein the selection of the object causes the operation or application commands to be performed without further navigation to another screen or application commands, and to present results of the operation in the graphical user interface.

18. The system of claim 17 wherein specializing the query comprises aggregating queries across multiple organizations in the multitenant database environment.

19. The system of claim 17 wherein specializing the query comprises aggregating queries across multiple groups in the multitenant database environment.

20. The system of claim 17 wherein specializing the query comprises customizing the query utilizing machine learning based on user behavior and user research.

* * * * *